(12) United States Patent
Andvik et al.

(10) Patent No.: US 9,145,807 B2
(45) Date of Patent: Sep. 29, 2015

(54) SCR SYSTEM COMPRISING A REDUCTANT DISTRIBUTOR

(71) Applicant: Deere & Company, Moline, IL (US)

(72) Inventors: Marc J Andvik, Cedar Falls, IA (US); Lukas J Lund, Reynoldsburg, OH (US); Ronald R. Kaunisto, Dafter, MI (US); Christopher S. Hughes, Erie, PA (US); Alex Kaidan, Seymour, IN (US)

(73) Assignee: DEERE & COMPANY, Moline, IL (US)

( * ) Notice: Subject to any disclaimer, the term of this patent is extended or adjusted under 35 U.S.C. 154(b) by 268 days.

(21) Appl. No.: 13/847,124

(22) Filed: Mar. 19, 2013

(65) Prior Publication Data

US 2014/0283933 A1    Sep. 25, 2014

(51) Int. Cl.
*F01N 3/00* (2006.01)
*F01N 3/02* (2006.01)
*F01N 3/10* (2006.01)
*F01N 3/20* (2006.01)

(52) U.S. Cl.
CPC .......... *F01N 3/208* (2013.01); *F01N 2610/1413* (2013.01); *F01N 2610/1473* (2013.01); *Y02T 10/24* (2013.01); *Y10T 137/85938* (2015.04)

(58) Field of Classification Search
USPC .................................................... 60/295, 324
See application file for complete search history.

(56) References Cited

U.S. PATENT DOCUMENTS

| 7,647,767 B2* | 1/2010 | Osaku et al. .................... 60/286 |
| 2006/0107656 A1 | 5/2006 | Bruck |
| 2010/0139258 A1 | 6/2010 | Hackett et al. |
| 2011/0192140 A1 | 8/2011 | Olivier et al. |
| 2012/0045378 A1 | 2/2012 | Soukhojak et al. |

* cited by examiner

*Primary Examiner* — Audrey K Bradley
*Assistant Examiner* — Dapinder Singh (57) ABSTRACT

An SCR system comprising a reductant tank, a return passageway, and a reductant distributor. The return passageway is coupled fluidly to the reductant tank via an outlet of the return passageway. A reductant distributor is positioned at the outlet. The reductant distributor is configured to distribute spatially an undispensed portion of a reductant into the reductant tank from the return passageway.

17 Claims, 6 Drawing Sheets

SCR SYSTEM COMPRISING A REDUCTANT DISTRIBUTOR

FIELD OF THE DISCLOSURE

The present disclosure relates to selective catalytic reduction ("SCR") system. More specifically, the present disclosure relates to an SCR system comprising a reductant distributor.

BACKGROUND OF THE DISCLOSURE

All engines—diesel, gasoline, propane, and natural gas—produce exhaust gas containing carbon monoxide, hydrocarbons, and nitrogen oxides. These emissions are the result of incomplete combustion. Diesel engines also produce particulate matter. As more government focus is being placed on health and environmental issues, agencies around the world are enacting more stringent emissions' laws.

Because so many diesel engines are used in trucks, the U.S. Environmental Protection Agency and its counterparts in Europe and Japan first focused on setting emissions regulations for the on-road market. While the worldwide regulation of nonroad diesel engines came later, the pace of cleanup and rate of improvement has been more aggressive for nonroad engines than for on-road engines.

Manufacturers of nonroad diesel engines are expected to meet set emissions regulations. For example, Tier 3/Stage III A emissions regulations required an approximate 65 percent reduction in particulate matter (PM) and a 60 percent reduction in NOx from 1996 levels. As a further example, Interim tier 4/Stage III B regulations required a 90 percent reduction in PM along with a 50 percent drop in NOx. Still further, Final Tier 4/Stage IV regulations, which will be fully implemented by 2015, will take PM and NOx emissions to near-zero levels.

In known SCR systems, an undispensed portion of a reductant is disseminated to the reductant tank. The undispensed portion of the reductant may flow in an undistributed, smooth stream into the reductant that is already being held in the reductant tank. If the reductant in the reductant tank is frozen, then the undispensed portion of the reductant, being in a relatively warmer, liquid form, initially creates a small hole in the frozen reductant. Eventually, the small hole enlarges such that the undispensed portion of the reductant flows right through the hole to the bottom of the reductant tank. During these conditions, the SCR system does not effectively leverage the warming capacity of the undispensed portion of the reductant.

Further, in known SCR systems, the undispensed portion of the reductant is not aimed towards any specific component in the reductant tank, such as a level sensor, thereby potentially leaving the level sensor frozen in place for longer than necessary.

SUMMARY OF THE DISCLOSURE

According to the present disclosure, there is provided an SCR system comprising a reductant tank, a return passageway, and a reductant distributor. The return passageway is coupled fluidly to the reductant tank via an outlet of the return passageway. A reductant distributor is positioned at the outlet, and the reductant distributor is configured to distribute spatially an undispensed portion of a reductant into the reductant tank from the return passageway.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
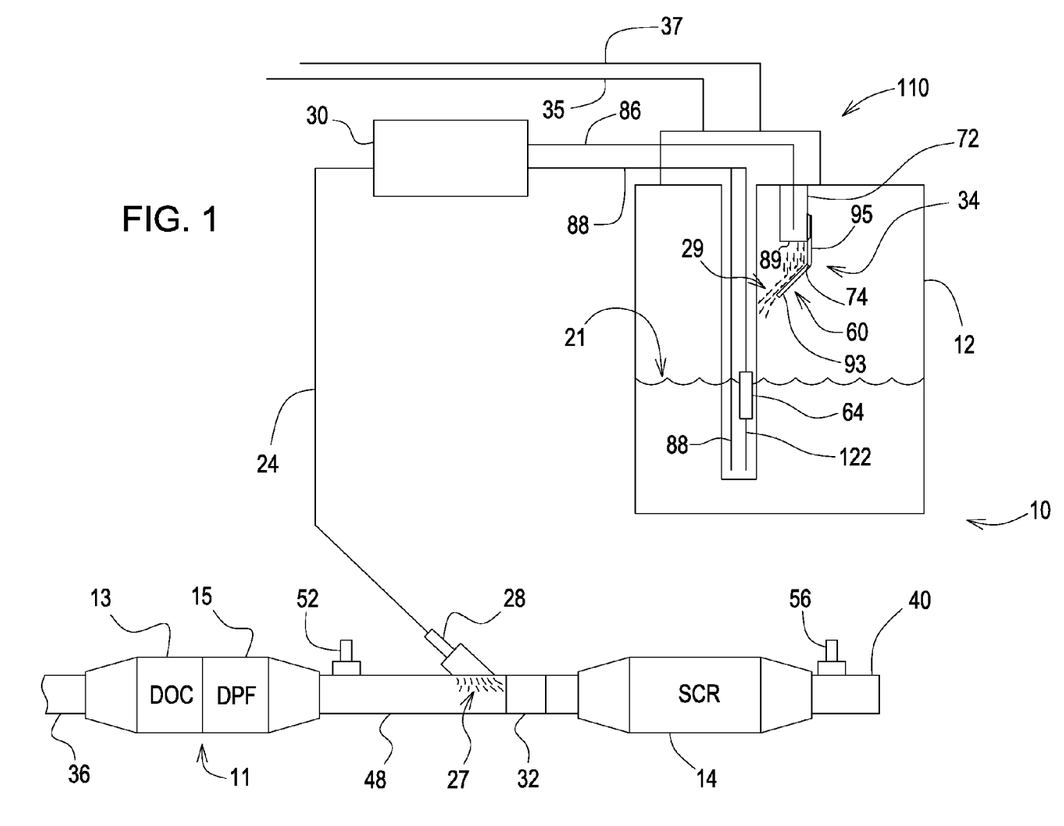
FIG. 1 is a diagrammatic view of an SCR system comprising a reductant distributor.

FIG. 1 is a diagrammatic view of an SCR system 10 comprising a reductant distributor 34. In the embodiment shown, just prior to the SCR system 10, an exhaust filter 11 comprises a diesel oxidation catalyst ("DOC") 13 and a diesel particulate filter ("DPF") 15.

Under normal operating conditions, exhaust gas flowing from an inlet tube 36 flows into the DOC 13 and reacts with the exhaust gas to reduce carbon monoxide, hydrocarbons, and some PM. PM is a non-gaseous product of combustion commonly seen as smoke. It is made up of carbon which is incompletely burned fuel and hydrocarbons which are unburned fuel that acts like a glue holding many particles of carbon together. PM also contains sulfuric acid which is created from the sulfur found in diesel fuel. The exhaust gas not only contains PM, but also NOx and ash. Ash is derived from engine lube oil and any fuel additives which may have been used.

PM and ash are both trapped in the DPF 15, allowing NOx to exit the exhaust filter 11. More specifically, the DPF 15 forces exhaust gas to flow through porous channel walls (not shown), thereby trapping and holding the remaining PM. The trapped PM is eventually oxidized within the DPF 15 via cleaning processes (e.g., passive and active regeneration).

The SCR system 10 may be used for minimizing NOx levels in addition to, or alternatively to, an EGR system (not shown). In the SCR system 10, as shown in FIG. 1, as the exhaust gas exits the exhaust filter, it flows across a NOx sensor 52, then by a reductant injector 28 that injects an appropriate amount of a dispensed portion of the reductant 27, from a dosing passageway 24, into the exhaust gas.

In a decomposition tube 48 and a reductant mixer 32, the dispensed portion of the reductant 27 mixes with the exhaust gas. As the exhaust gas flows through the SCR system 10, the nitrogen oxides react with the reductant, forming harmless nitrogen gas and water vapor, and the exhaust gas flows by a second NOx sensor 56, and out of an outlet tube 40 to the atmosphere. The reductant herein may be understood as any compound (e.g., ammonia) or precursor compound (e.g., a urea solution) that may be relied upon to assist a catalyst to reduce output levels of NOx from a combustion process.

The SCR system 10 may also comprise an SCR catalyst 14. The reductant pump 30 may be positioned fluidly, between the SCR catalyst 14 and the reductant tank 12, to supply the dispensed portion of the reductant 27, from a supply passageway 88, to the dosing passageway 24 and to the SCR catalyst 14.

In the embodiment shown, the SCR system 10 comprises a reductant tank 12, a reductant pump 30, a supply passageway 88, a return passageway 86, and a reductant distributor 34. The supply passageway 88 is coupled fluidly to the reductant tank 12 and the reductant pump 30 therebetween. In some embodiments, the return passageway 86 may be coupled fluidly to the reductant pump 30 and the reductant tank 12 therebetween. In other embodiments, an end of the return passageway 86 may be fluidly coupled to, for example, the reductant injector 28, rather than to the reductant pump 30. A reductant distributor 34 is positioned at the outlet 89 and is configured to distribute spatially an undispensed portion of a reductant 29 into the reductant tank 12 from the return passageway 86.

One example of a reductant is one having 32.5% high purity urea and 67.5% deionized water. Such a reductant may begin to freeze at approximately 12 deg F. (−11 deg C.). If the reductant freezes when a vehicle comprising the SCR system 10 is shut down, then the reductant may need to be thawed before the SCR system 10 can function.

To do this, the return passageway 86, the supply passageway 88, and the reductant tank 12 may be warmed—collectively or individually—via, for example, engine coolant or a resistive heater (not shown). As shown in FIG. 1, a coolant inlet passageway 35 may allow coolant to enter the reductant header 110, and a coolant outlet passageway 37 may allow coolant to exit the reductant header 110. The undispensed portion of the reductant 29 may, under some operating conditions, be relatively warm relative to the reductant 21 that is in the reductant tank 12. This is because the undispensed portion of the reductant 29 is in a liquid state when it enters the reductant tank 12, while the reductant 21 that is in the reductant tank 12 may be at least partially frozen. Additionally, the undispensed portion of the reductant 29 may be relatively warm relative to the reductant 21 that is in the reductant tank 12, assuming that one or both of the return passageway 86 and the supply passageway 88 are heated via, for example, a resistive heater (not shown).

Without the reductant distributor 34, the undispensed portion of the reductant 29 may flow in an undistributed, smooth stream into the reductant 21 that is in the reductant tank 12. If the reductant 21 in the reductant tank 12 is frozen, then the undispensed portion of the reductant 29, being in a relatively warm, liquid form, may create just a small hole in the frozen reductant 21. By using the reductant distributor 34, the undispensed portion of the reductant 29 is distributed spatially over a larger area of the reductant tank 12 than would be otherwise. As such, the undispensed portion of the reductant 29 warms a larger area of the potentially frozen reductant 21 that is in the reductant tank 12.

The SCR system 10 may comprise a reductant header 110 and a return tube 72. The reductant header 110 may be coupled to the reductant tank 12. The return tube 72 at least partially defines the return passageway 86.

In the embodiment shown in FIGS. 1-4, the reductant distributor 34 comprises a plate 60 bent so as to extend under the return passageway 86 and angled (see angle 76 in, for example, FIG. 3) relative to an axis of the return tube 82 toward a portion 136 of the reductant header 110 positioned within the reductant tank 12. In some other embodiments, the reductant distributor 34 may be angled away from the reductant header 110.

Figure 3:
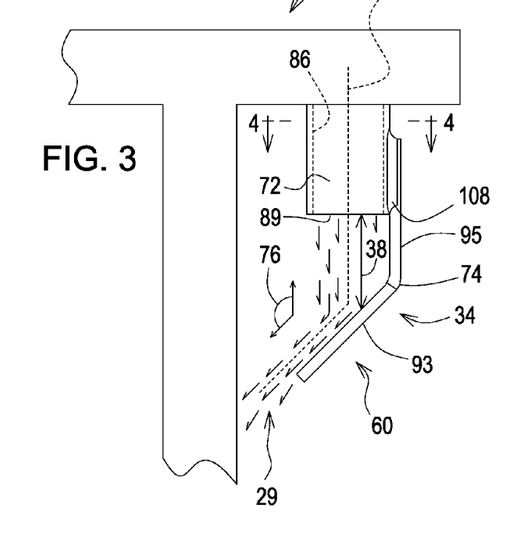
FIG. 3 is partially a diagrammatic view of reductant header and partially a side elevational view of the first embodiment of the reductant distributor, the reductant distributor being welded to a return tube.

By angling the reductant distributor 34, the undispensed portion of the reductant 29 is leveraged so as to warm the portion 136 of the reductant header 110. The portion may be, for example, a level sensor 64, because the level sensor 64 may otherwise, at times, be frozen in the reductant 21 that is in the reductant tank 12 for an unnecessary amount of time.

The reductant distributor 34 may be made of a material that can withstand the corrosiveness of the reductant. Such materials may include, to name just a few, the following: Stainless Steel; Titanium; N—Mo—Cr—Mn—Cu—Si—Fe alloys; Polypropylene; Polyethylene; Perfluoroalkoxyl Alkane; Polyfluroroethylene; Polyvinylideneflouride; Polytetraflouroethylene; Copolymers of Vinylideneflouride; and Hexaflouropropylene.

Figure 2:
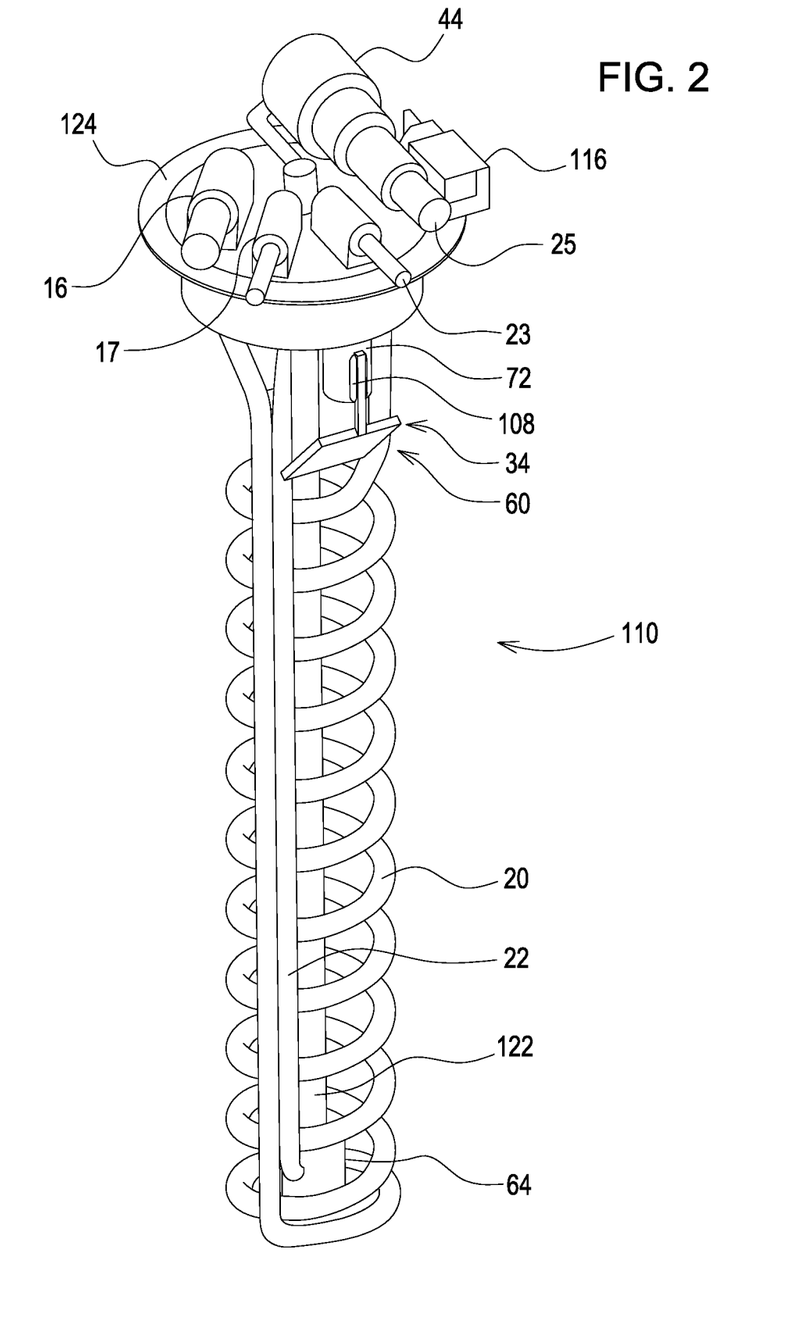
FIG. 2 is a perspective view of one example of a reductant header and a first embodiment of the reductant distributor.

FIG. 2 is a perspective view of an example of a reductant header 110 and a first embodiment of the reductant distributor 34. In this embodiment, the reductant header 110 comprises a reductant suction fitting 17, a reductant return fitting 23, and a reductant suction tube 22. The reductant suction tube 22 is positioned fluidly between the reductant suction fitting 17 and the reductant return fitting 23. A return tube 72 may be in fluid communication with the reductant return fitting 23. Further, as shown, the reductant header 110 comprises a coolant inlet fitting 16, a coolant outlet fitting 25, and a coolant tube 20. The coolant tube 20 is positioned between the coolant inlet fitting 16 and the coolant outlet fitting 25. A coolant control valve 44 may be positioned between the coolant tube 20 and the coolant outlet fitting 25. Coolant (e.g., engine coolant) flows through the coolant tube 20 to potentially warm and thaw any frozen reductant 21 that might be present in the reductant tank 12. The reductant suction tube 22 may be fluidly coupled to the reductant suction fitting 17.

An electrical connector 116 may be in electrical communication with, for example, a level sensor 64 and a coolant control valve 23. The coolant control valve 23 controls the flow rate of the coolant flow through the coolant tube 20. When, for example, coolant is needed for warming the reductant 21 in the reductant tank 12, the coolant control valve 23 may be in an open position.

The level sensor 64 may be, for example, a contact level sensor or a non-contact level sensor. Contact levels sensors come into contact with the reductant 21 and exemplarily include reed switches, differential pressure transducers, bubble-type pressure transducers, magnetostrictive floats, and capacitance transmitters. In one embodiment of a contact level sensor, the contact level sensor may comprise a plurality of reed switches spaced apart relative to one another. The level sensor 64 may move up-and-down on a level sensor post 122, as shown in FIG. 2. Non-contact level sensors do not come into contact with the reductant 21, and such sensors exemplarily include ultrasonic systems, laser systems, and radar systems.

The reductant header 110 may comprise a reductant temperature sensor (not shown), which may be used for measuring the temperature of the reductant, the measurement being used for, for example, determining how much coolant may be necessary to warm the reductant. The reductant header 110 may be mounted with, for example, a retaining ring 124 and a pair of fasteners (not shown). Additionally, the reductant header 110 may comprise a vent (not shown) so that the expansion and contraction of the gas in the reductant tank 12 does not damage or interfere with the SCR system 10. The vent may also used to remove and add air as the reductant is being added and removed from the reductant tank 12, respectively.

Figure 4:
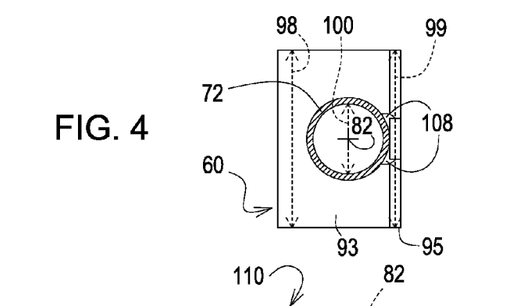
FIG. 4 is a sectional view taken along lines 4-4 of FIG. 3 showing the return tube and the reductant distributor.

FIG. 3 is partially a diagrammatic view of the reductant header 110 and partially a side elevational view of the first embodiment of the reductant distributor 34. In contrast, FIG. 4 is a sectional view taken along lines 4-4 of FIG. 3, and it shows the return tube 72 and the reductant distributor 34. Here, the reductant distributor 34 is welded to the return tube 72 via a weld 144. The plate 60 may be coupled to the return tube 72, and as shown in FIG. 3, for example, the plate 60 may be welded to the return tube 72 via a weld 108. Although the weld 108 is shown as two separate welds, just a single weld might also provide sufficient strength in some embodiments.

Exemplarily, the plate 60 comprises a first section 93, a second section 95, and a first bend 74. The first section 93 may be a distributor element 46. The first bend 74 is positioned between the first section 93 and the second section 95. The first section 93 distributes spatially the undispensed portion of the reductant 29 into the reductant tank 12, and the second section 95 holds the first section 93 into place. In the embodiment shown, a dimension 98 of the first section 93 is larger than a diameter 100 of the return tube 72, but this may not be so in other embodiments. Similarly, in the embodiment shown, the dimension 98 of the first section 93 is equivalent to a dimension 99 of the second section 95, but this also may not be so in other embodiments.

Figure 5:
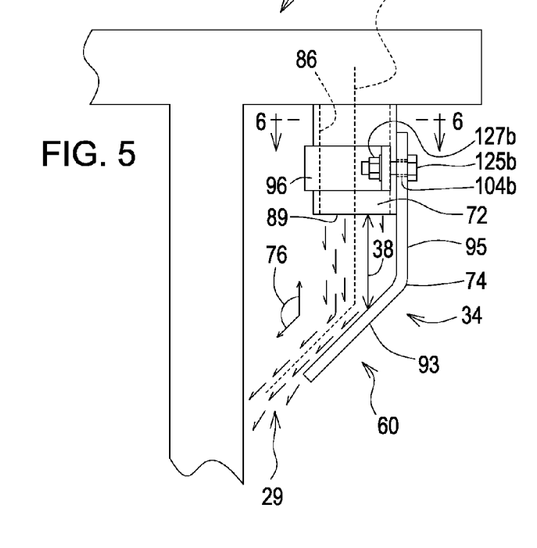
FIG. 5 is a view like that of FIG. 3, but showing the first embodiment of the reductant distributor being coupled to the return tube via a mounting bracket.
Figure 6:
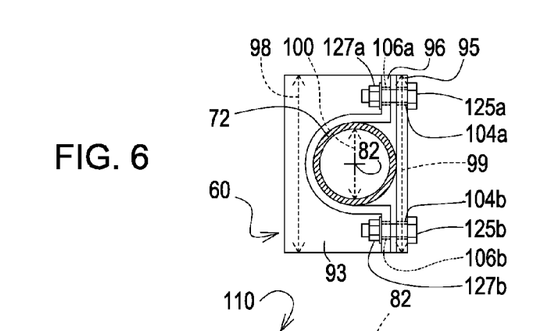
FIG. 6 is a sectional view taken along lines 6-6 of FIG. 5 showing the return tube and the mounting bracket.

FIG. 5 is a view like that of FIG. 3, but showing the reductant distributor 34 being coupled to the return tube 72 via a mounting bracket 96 and two fasteners 125a, 125b rather than being coupled via a weld. In contrast, FIG. 6 is a sectional view taken along lines 6-6 of FIG. 5 showing the return tube 72 and the mounting bracket 96. The mounting bracket 96 may comprise two mounting bracket apertures 106a, 106b and it may be positioned around the return tube 72. The plate 60 may comprise two plate apertures 104. Two fasteners 125a, 125b and two nuts 127 may cooperate to so as to retain the plate 60 to the return tube 72. The two of fasteners 125a, 125b may be positioned respectively in the two of plate apertures 104a, 104b and in the two mounting bracket apertures 106a, 106b.

Figure 7:
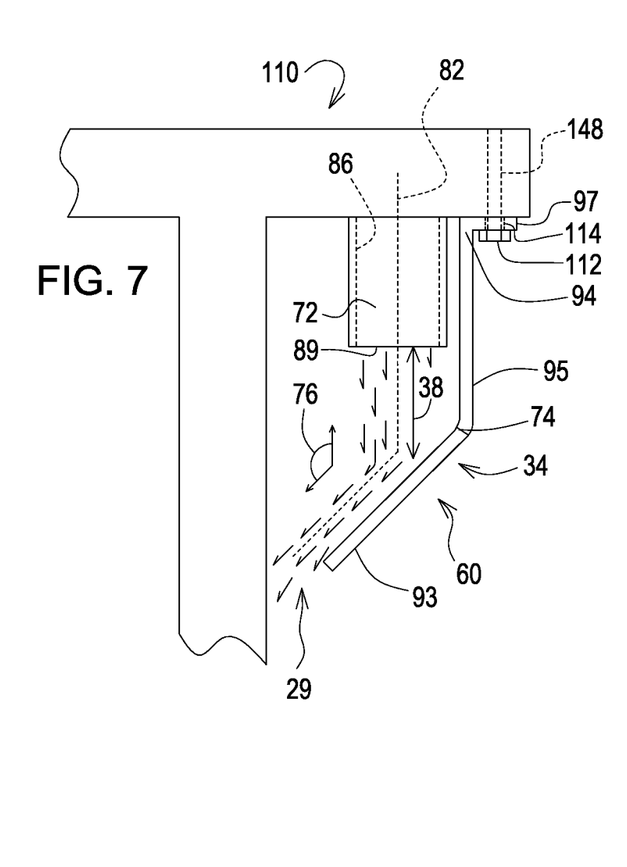
FIG. 7 is partially a diagrammatic view of the reductant header and partially a side elevational view of a second embodiment of the reductant distributor, the reductant distributor being fastened to the reductant header.

FIG. 7 is partially a diagrammatic view of the reductant header 110 and partially a side elevational view of a second embodiment of the reductant distributor 34, the reductant distributor 34 being fastened to the reductant header 110 via a fastener 112. As shown, the plate 60 may comprise a plate aperture 114, and the reductant header 110 may comprise a header aperture 148. The fastener 112 may be positioned in the plate aperture 114 and the header aperture 148 so as to retain the plate 60 to the reductant header 110.

Figure 8:
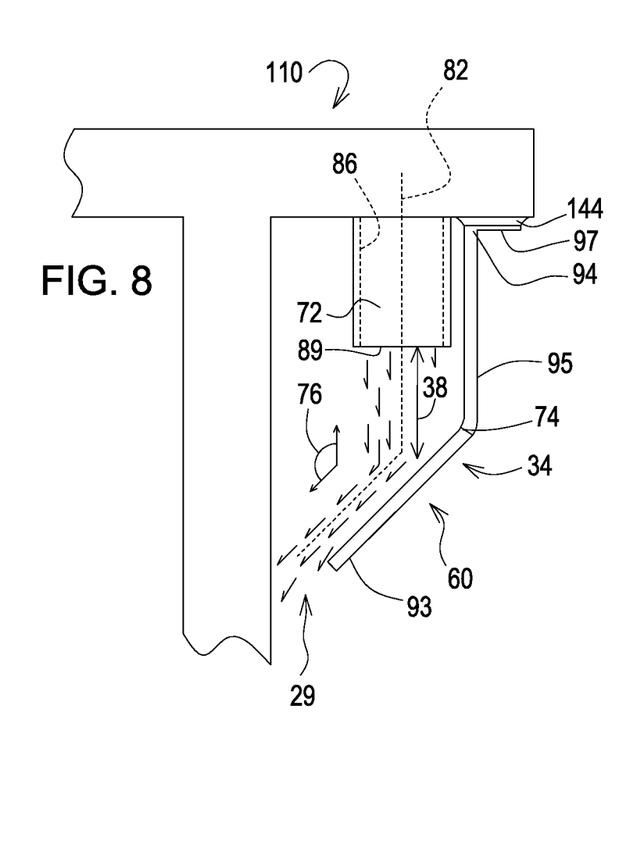
FIG. 8 is a view like that of FIG. 7, but showing the reductant distributor being welded to the reductant header.

FIG. 8 is a view like that of FIG. 7, but showing the reductant distributor 34 being welded to the reductant header 110, via a weld 144, rather than being fastened to the reductant header 110. As shown in both FIGS. 7 and 8, the plate 60 may comprise a second bend 94 and a third section 97, wherein the second bend 94 may be positioned between the second section 95 and the third section 97. The third section 97 may mate with the reductant header 110.

Figure 9:
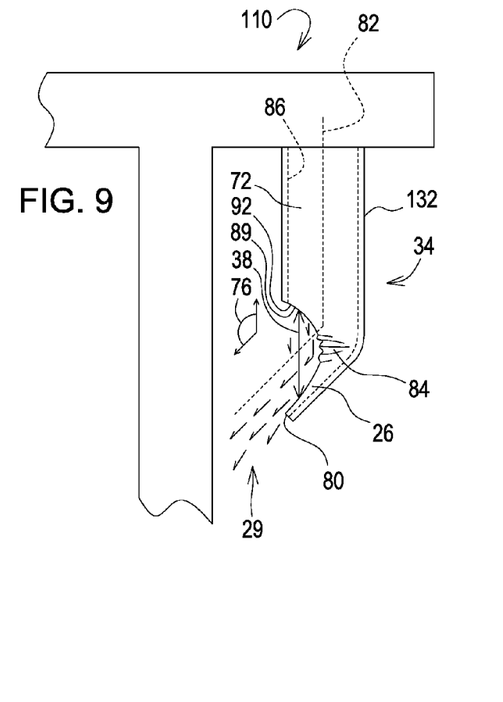
FIG. 9 is partially a diagrammatic view of the reductant header and partially a side elevational view of a third embodiment of the reductant distributor.

FIG. 9 is partially a diagrammatic view of the reductant header 110 and partially a side elevational view of a third embodiment of the reductant distributor 34. In this embodiment, the return tube 72 at least partially defines the return passageway 86. Further, the return tube 72 may comprise an end edge 80 and a side wall 84 extending from the end edge 80 and formed to include a hole 92 contiguous with the end edge 80, thereby providing the side wall 84 with a tip portion 26 that extends from and is bent under a cylindrical portion 132 of the side wall 84 so as to define the reductant distributor 34. The return tube 72 may be formed by, for example, drilling a hole into the side wall of a tube with the hole extending to the end edge of the tube, and then bending the tube so that the tip portion 26, as just mentioned, extends from and is bent under the cylindrical portion 132.

Figure 10:
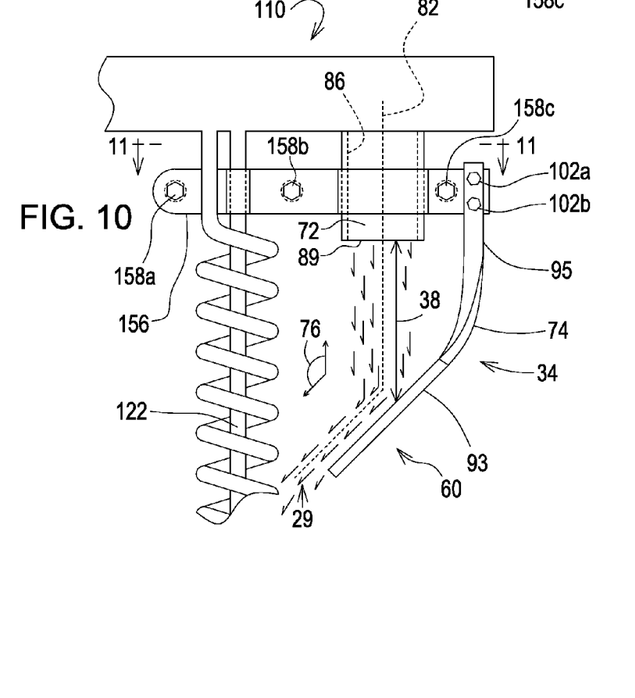
FIG. 10 is partially a diagrammatic view of the reductant header and partially a side elevational view of a fourth embodiment of the reductant distributor.
Figure 11:
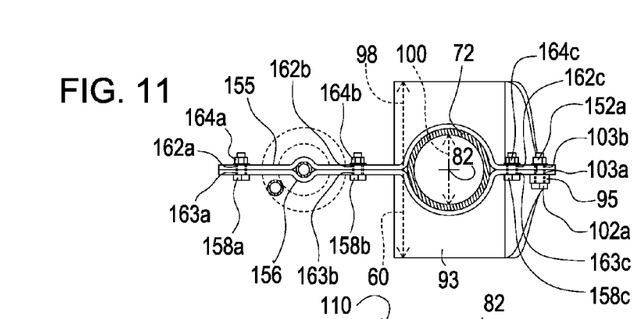
FIG. 11 is a sectional view taken along lines 11-11 of FIG. 10 showing the fourth embodiment of the reductant distributor and a double tube clamp.

FIG. 10 is partially a diagrammatic view of the reductant header 110 and partially a side elevational view of a fourth embodiment of the reductant distributor 34. FIG. 11, alternatively, is a sectional view taken along lines 11-11 of FIG. 10. In this embodiment, the SCR system 10 comprises a double tube clamp 78, the double tube clamp 78 being positioned about the return tube 72 and about a second portion 140 of the reductant header 110. The second portion 140 may be, for example, the coolant tube 20, the reductant tube 22, or the level sensor post 122.

As shown in FIGS. 10 and 11, the double tube clamp 78 may comprise a first half 155 and a second half 156, the first half 155 mating thereto. In other embodiments though, the double tube clamp 78 may be, for example, just a single element that bends around the return tube 72 as well as the second portion 140. Exemplarily, the reductant distributor 34 may be coupled to the double tube clamp 78 via a fastener 102a, a fastener 102b, a nut 152a, and a nut (not shown). The two fasteners 102a, 102b may be positioned respectively in two apertures 103a, 103b. Further, the first half 155 of the double tube clamp 78 may comprise three apertures 162a, 162b, and 162c, and the second half 156 of the double tube clamp 78 may comprise three apertures 163a, 163b, 163c. Three fasteners 158a, 158b, and 158c may be positioned respectively in the three apertures 162a, 162b, 162c and also in the three apertures 163a, 163b, 163c. Accordingly, the three fasteners 158a, 158b, 158c may cooperate with three nuts 164a, 164b, 164c to hold the first and second halves 155, 156 together.

In the embodiment shown, the reductant distributor 34 may be formed via twisting a sheet of material that initially resembles the shape of, for example, a paddle. Such a shape has, as shown in FIG. 10, a short dimension 166 and, as shown in FIG. 11, a long dimension 168 (as compared to the short dimension 166). The short dimension 166 may be one that is suitable for coupling the reductant distributor 34, and the long dimension 168 may be one that is suitable for distributing spatially the undispensed portion of the reductant 29 into the reductant tank 12.

Figure 12:
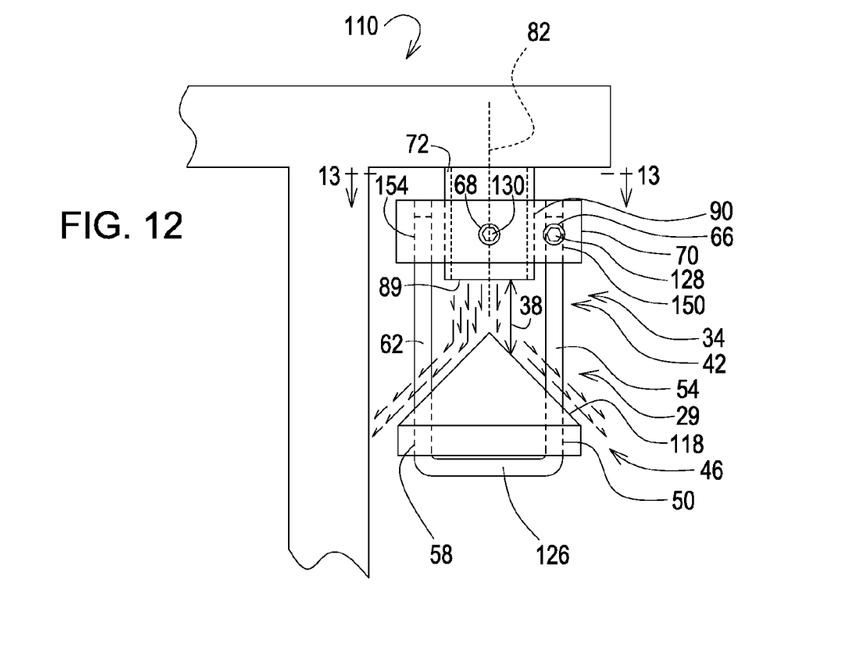
FIG. 12 is partially a diagrammatic view of the reductant header and partially a side elevational view of a fifth embodiment of the reductant distributor.
Figure 13:
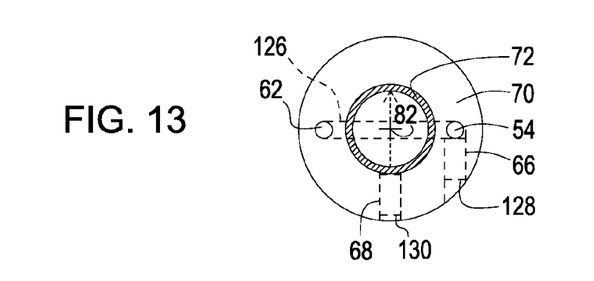
FIG. 13 is a sectional view taken along lines 13-13 of FIG. 12 showing the fifth embodiment of the reductant distributor.

FIG. 12 is partially a diagrammatic view of the reductant header 110 and partially a side elevational view of a fifth embodiment of the reductant distributor 34. Alternatively, FIG. 13 is a sectional view taken along lines 13-13 of FIG. 12 showing the fifth embodiment of the reductant distributor 34. The reductant distributor 34 comprises a distributor element 46 and a mount 42. The distributor element 46 is coupled to the mount 42, and the mount 42 positions and stabilizes the distributor element 46 relative to the return tube 72. The distributor element 46 may comprise a surface 118 that faces the flow of the undispensed portion of the reductant 29. The surface 118 may be convexly shaped or, as a more specific example, conically shaped (see FIG. 12). The shape of the surface 118 may be formed by, for example, a lathe. A gap 38 may be positioned between the return tube 72 and the distributor element 46.

As shown, in FIG. 12, the distributor element 46 may comprise a first distributor element aperture 50 and a second distributor element aperture 58. The mount 42 may comprise a first bar 54 and a second bar 62. The first bar 54 may be positioned in the first distributor element aperture 50, and the second bar 62 may be positioned in the second distributor element aperture 58. The first bar 54 and the second bar 62 may be parallel to one another. The mount 42 may comprise a connector 126 positioned between and formed into the first bar 54 and formed into the second bar 62. The first bar 54 and the connector 126 and the second bar 62 may form a u-shape. The u-shape may be formed by bending, for example, stainless steel, or the u-shape may be formed by molding plastic or rubber.

The SCR system 10 may comprise a first fastener 128 and a second fastener 130. The mount 42 may comprise a ring 70. The ring 70 may comprise a first ring aperture 66, a second ring aperture 68, a first blind ring aperture 150, and a second blind ring aperture 154. The first fastener 128 may be positioned in the first ring aperture 142 and may retain the ring 70 to the return tube 72. The second fastener 130 may be positioned in the second ring aperture 146 and may retain the first bar 54 to the ring 70. The first bar 54 may be positioned in the first blind ring aperture 150, and the second bar 62 may be positioned in the second blind ring aperture 154.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. Further embodiments of the invention may include any combination of features from one or more dependent claims, and such features may be incorporated, collectively or separately, into any independent claim. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A selective catalytic reduction system ("SCR system"), comprising:
   a reductant tank;
   a return passageway coupled fluidly to the reductant tank via an outlet of the return passageway;
   a reductant distributor positioned at the outlet, the reductant distributer comprising a distributer element, the reductant distributor configured to distribute spatially an undispensed portion of a reductant into the reductant tank from the return passageway; and
   a gap positioned between the return tube and the distributer element.

2. The SCR system of claim 1, comprising a return tube at least partially defining the return passageway, wherein the return tube comprises a tip portion bent so as to define the reductant distributor.

3. The SCR system of claim 2, wherein the return tube comprises an end edge and a side wall extending from the end edge and formed to include a hole contiguous with the end edge, thereby providing the side wall with the tip portion that extends from and is bent under a cylindrical portion of the side wall so as to define the reductant distributor.

4. The SCR system of claim 1, wherein the reductant distributor comprises a mount, the distributor element is coupled to the mount, and the mount positions and stabilizes the distributor element relative to the return tube.

5. The SCR system of claim 4, wherein the distributor element comprises a surface, the surface faces the flow of the undispensed portion of the reductant and is convexly shaped.

6. The SCR system of claim 5, wherein the surface is conically shaped.

7. The SCR system of claim 4, wherein the distributor element comprises a first distributor element aperture and a second distributor element aperture, the mount comprises a first bar and a second bar, the first bar is positioned in the first distributor element aperture, the second bar is positioned in the second distributor element aperture, the first bar and the second bar are parallel to one another, the mount comprises a connector positioned between and formed into the first and second bars, and the first bar, the connector, and the second bar form a u-shape.

8. The SCR system of claim 7, comprising a first fastener and a second fastener, wherein the mount comprises a ring, the ring comprises a first ring aperture and a second ring aperture and a first blind ring aperture and a second blind ring aperture, the first fastener is positioned in the first ring aperture and retains the ring to the return tube, the second fastener is positioned in the second ring aperture and retains the first bar to the ring, the first bar is positioned in the first blind ring aperture, and the second bar is positioned in the second blind ring aperture.

9. The SCR system of claim 1, comprising a reductant header and a return tube, wherein the reductant header is coupled to the reductant tank, the return tube at least partially defines the return passageway, the reductant distributor comprises a plate bent so as to extend under the return passageway and angled relative to an axis of the return tube toward a portion of the reductant header positioned within the reductant tank.

10. The SCR system of claim 9, wherein the portion of the reductant header is a level sensor.

11. The SCR system of claim 9, comprising a double tube clamp positioned about the return tube and about a second portion of the reductant header, wherein the reductant distributor is coupled to the double tube clamp.

12. The SCR system of claim 9, wherein the plate is coupled to the return tube.

13. The SCR system of claim 12, wherein the plate is welded to the return tube.

14. The SCR system of claim 12, comprising a mounting bracket positioned around the return tube and two fasteners, wherein the plate comprises two apertures, and the two fasteners are positioned respectively in the two plate apertures so as to retain the plate to the return tube.

15. The SCR system of claim 9, wherein the plate is coupled to the reductant header.

16. The SCR system of claim 15, wherein the plate is welded to the reductant header.

17. The SCR system of claim 15, comprising a fastener, wherein the plate comprises a plate aperture, and the fastener is positioned in the plate aperture so as to retain the plate to the reductant header.

* * * * *